(12) United States Patent
Martinez et al.

(10) Patent No.: US 7,085,892 B2
(45) Date of Patent: Aug. 1, 2006

(54) METHOD, SYSTEM, AND PROGRAM FOR REMOVING DATA IN CACHE SUBJECT TO A RELATIONSHIP

(75) Inventors: Richard Kenneth Martinez, Tucson, AZ (US); Joseph Smith Hyde, II, Tucson, AZ (US); Thomas John Creath, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 10/464,029

(22) Filed: Jun. 17, 2003

(65) Prior Publication Data
US 2004/0260882 A1    Dec. 23, 2004

(51) Int. Cl.
*G06F 12/00* (2006.01)
(52) U.S. Cl. .................. 711/133; 711/158; 711/162
(58) Field of Classification Search .................. None
See application file for complete search history.

(56) References Cited

U.S. PATENT DOCUMENTS

| | | | |
|---|---|---|---|
| 6,076,148 A * | 6/2000 | Kedem ..................... 711/162 |
| 6,378,052 B1 * | 4/2002 | Genduso et al. ............ 711/158 |
| 6,598,134 B1 * | 7/2003 | Ofek et al. ................. 711/162 |
| 6,611,901 B1 | 8/2003 | Micka et al. |
| 2001/0005853 A1 * | 6/2001 | Parkes et al. ............... 709/106 |

OTHER PUBLICATIONS

Ian McDdonald, "Design", [online], Jul. 1997, [Retrieved on May 25, 2003]. Retrieved from the Internet at <URL: http://www.dcs.gla.ac.uk/~ian/project3/node30.html>.

* cited by examiner

*Primary Examiner*—Mano Padmanabhan
*Assistant Examiner*—Duc T Doan
(74) *Attorney, Agent, or Firm*—David W. Victor; Konrad Raynes & Victor LLP

(57) ABSTRACT

Provided are a method, system, and program for managing data. A scan request is received to remove data from cache included in a relationship after the relationship is established. Processing the scan request is delayed for a delay time in response to receiving the scan request. After the delay time, a determination is made as to whether a condition with respect to the scan request is satisfied. The scan request is processed to remove data from cache that is included in the relationship associated with the scan request if the condition is satisfied.

29 Claims, 13 Drawing Sheets

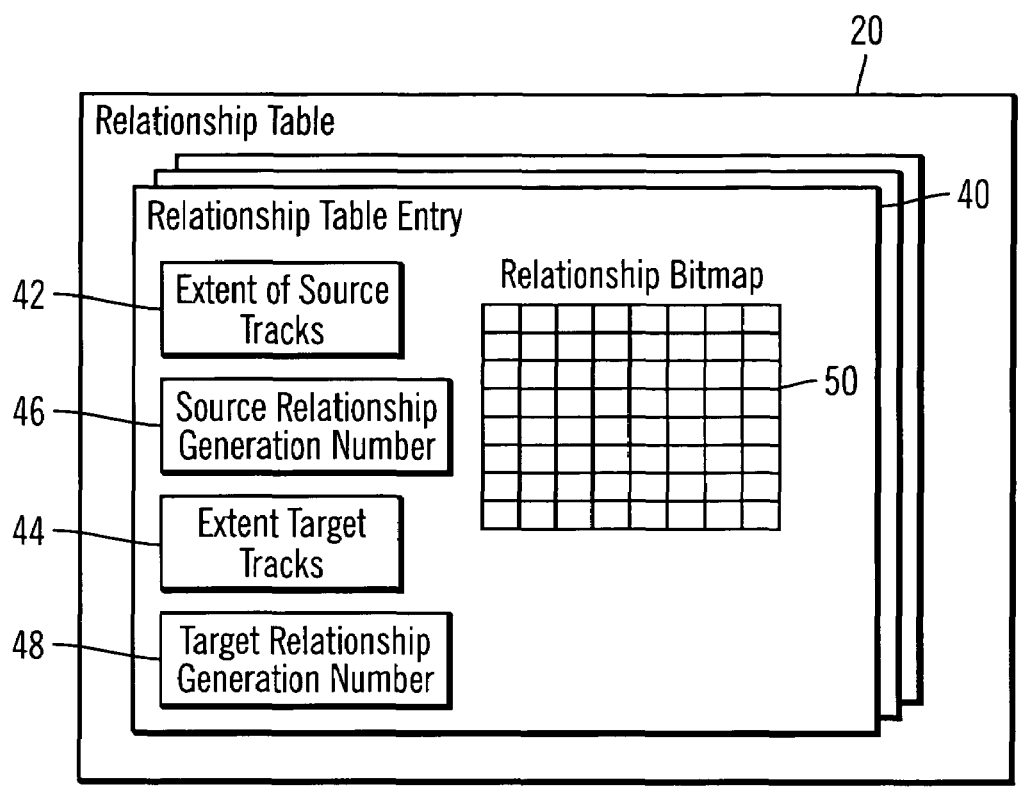
FIG. 2
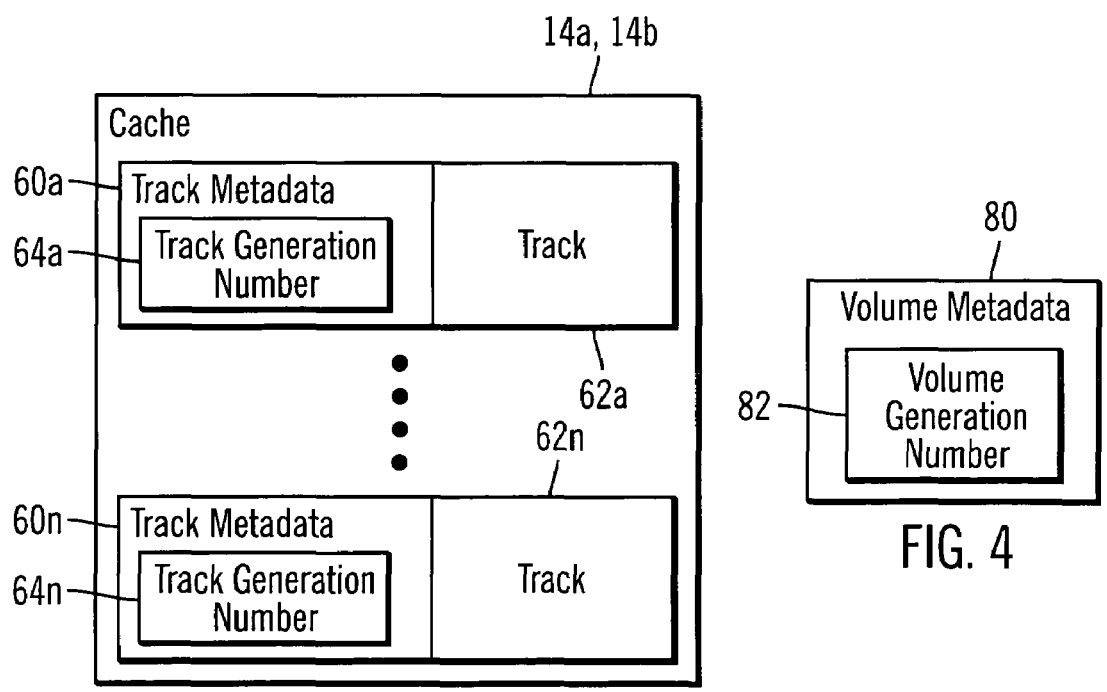
FIG. 3
FIG. 4

Scan Queue Entry

METHOD, SYSTEM, AND PROGRAM FOR REMOVING DATA IN CACHE SUBJECT TO A RELATIONSHIP

BACKGROUND OF THE INVENTION

1. Field of the Invention

The present invention relates to a method, system, and program for removing data in cache subject to a relationship.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time relationship between source and target volumes on different devices. Once the logical relationship is established, hosts may then have immediate access to data on the source and target volumes, and the data may be copied as part of a background operation. Reads to any tracks in the target cache that have not been updated with the data from the source causes the source track to be staged to the target cache before access is provided to the track from the target cache. Any reads of data on target tracks that have not been copied over cause the data to be copied over from the source device to the target cache so that the target has the copy from the source that existed at the point-in-time of the FlashCopy® operation. Further, any writes to tracks on the source device that have not been copied over cause the tracks on the source device to be copied to the target device.

In the prior art, as part of the establishment of the logical point-in-time relationship during the FlashCopy® operation, all tracks in the source cache that are included in the FlashCopy® must be destaged to the physical source volume, e.g., source DASD, and all tracks in the target cache included in the FlashCopy® must be discarded. These destage and discard operations during the establishment of the logical copy relationship can take several seconds, during which I/O requests to the tracks involved in the copy relationship are suspended. In critical operating environments, there is a continued effort to minimize any time during which I/O access is suspended. Further details of the FlashCopy® operations are described in the copending and commonly assigned U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

For these reasons, there is a continued need in the art to reduce the time needed to complete establishing a logical point-in-time copy between a source and target volumes.

SUMMARY OF THE DESCRIBED IMPLEMENTATIONS

Provided are a method, system, and program for managing data. A scan request is received to remove data from cache included in a relationship after the relationship is established. Processing the scan request is delayed for a delay time in response to receiving the scan request. After the delay time, a determination is made as to whether a condition with respect to the scan request is satisfied. The scan request is processed to remove data from cache that is included in the relationship associated with the scan request if the condition is satisfied.

In further implementations, the scan request is queued in a scan queue, wherein the scan queue may include multiple scan requests to remove data in different relationships from cache, and wherein processing the scan request may comprise processing one queued scan request in the scan queue.

Yet further, determining whether the condition with respect to the scan request is satisfied may comprise determining whether a time related to one queued scan request is less than a time period, wherein the condition is satisfied if the time related to the queued scan request is greater than the time period.

In still further implementations, determining whether the time related to one queued scan request comprises determining whether a difference between a current time and a time of a last received scan request is less than a time period, wherein the condition is satisfied if the difference is greater than the time period.

Described implementations provide techniques for removing data from cache included in a relationship after the relationship is established in order to better control the affect of such scan operation to remove data from cache on processor utilization.

BRIEF DESCRIPTION OF THE DRAWINGS

Referring now to the drawings in which like reference numbers represent corresponding parts throughout:

FIGS. 2, 3, and 4 illustrates data structures used to maintain a logical point-in-time copy relationship in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
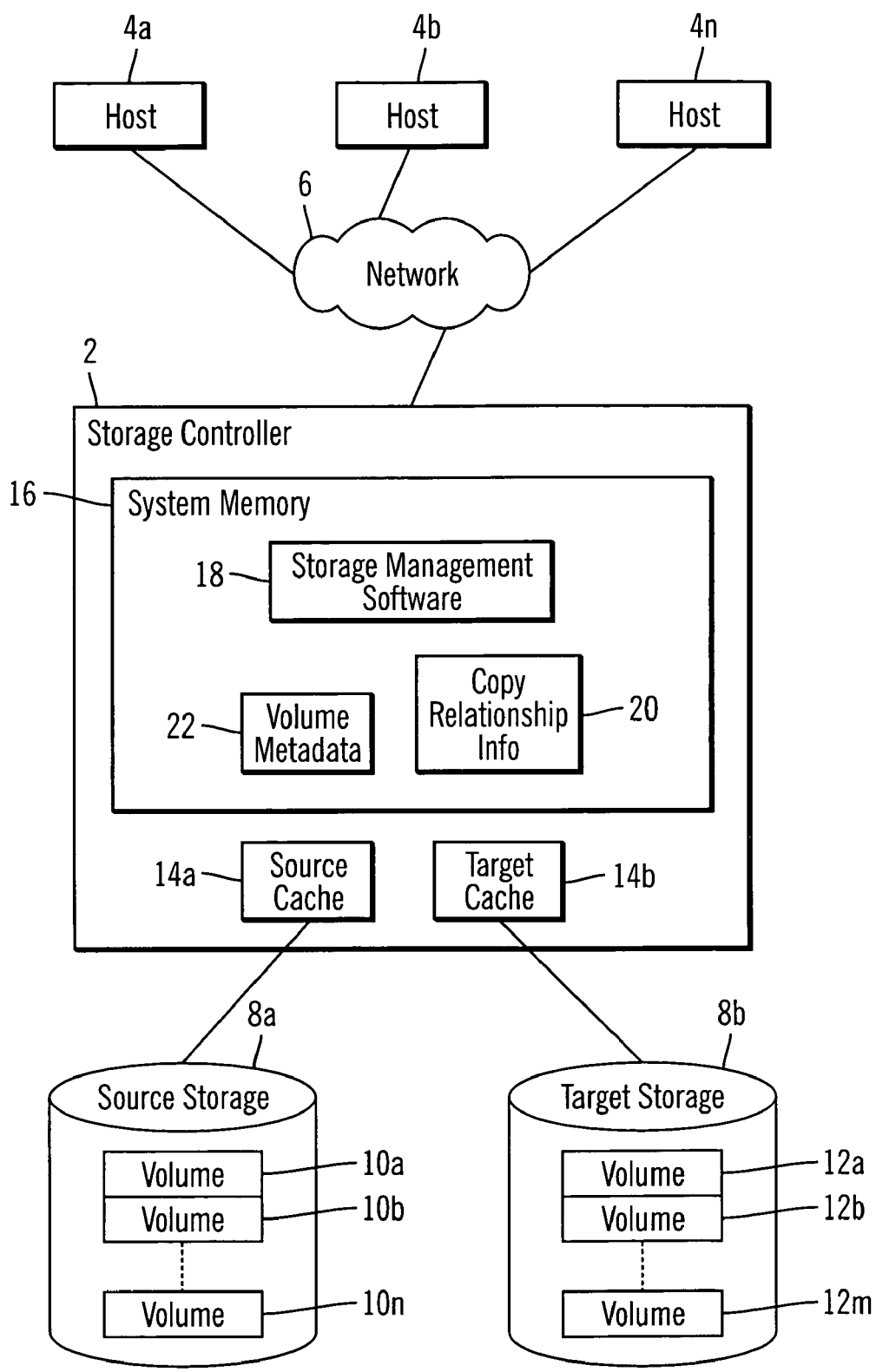
FIG. 1 illustrates a computing environment in which aspects of the invention are implemented.

FIG. 1 illustrates a computing architecture in which aspects of the invention are implemented. A storage controller 2 would receive Input/Output (I/O) requests from host systems 4a, 4b . . . 4n over a network 6 directed toward storage devices 8a, 8b configured to have volumes (e.g., Logical Unit Numbers, Logical Devices, etc.) 10a, 10b . . . 10n and 12a, 12b . . . 12m, respectively, where m and n may be different integer values or the same value. The storage controller 2 further includes a source cache 14a to store I/O data for tracks in the source storage 8a and a target cache 14b to store I/O data for tracks in the target storage 8b. The source 14a and target 14b caches may comprise separate memory devices or different sections of a same memory device. The caches 14a, 14b are used to buffer read and write data being transmitted between the hosts 4a, 4b . . . 4n and the storages 8a, 8b. Further, although caches 14a and 14b are referred to as source and target caches, respectively, for holding source or target tracks in a point-in-time copy relationship, the caches 14a and 14b may store at the same time source and target tracks in different point-in-time copy relationships.

The storage controller 2 also includes a system memory 16, which may be implemented in volatile and/or non-volatile devices. Storage management software 18 executes in the system memory 16 to manage the copying of data between the different storage devices 8a, 8b, such as the type of logical copying that occurs during a FlashCopy® operation. The storage management software 18 may perform operations in addition to the copying operations described herein. The system memory 16 may be in a separate memory device from caches 14a, 14b or a part thereof. The storage management software 18 maintains a relationship table 20 in the system memory 16 providing information on established point-in-time copies of tracks in source target volumes 10a, 10b . . . 10n at specified tracks in target volumes 12a, 12b . . . 12m. The storage controller 2 further maintains volume metadata 22 providing information on the volumes 10a, 10b . . . 10n, 12a, 12b . . . 12m.

The storage controller 2 would further include a processor complex (not shown) and may comprise any storage controller or server known in the art, such as the IBM Enterprise Storage Server (ESS)®, 3990® Storage Controller, etc. (Enterprise Storage Server is a registered trademark of IBM). The hosts 4a, 4b . . . 4n may comprise any computing device known in the art, such as a server, mainframe, workstation, personal computer, hand held computer, laptop, telephony device, network appliance, etc. The storage controller 2 and host system(s) 4a, 4b . . . 4n communicate via a network 6, which may comprise a Storage Area Network (SAN), Local Area Network (LAN), Intranet, the Internet, Wide Area Network (WAN), etc. The storage systems 8a, 8b may comprise an array of storage devices, such as a Just a Bunch of Disks (JBOD), Redundant Array of Independent Disks (RAID) array, virtualization device, etc.

When a host 4a, 4b . . . 4n initiates a point-in-time copy operation for specified tracks in volumes 10a, 10b . . . 10n in the source storage 8a to specified tracks in volumes 12a, 12b . . . 12m in the target storage 8b, the storage management software 18 will generate the relationship table 20 information when establishing a logical point-in-time copy. FIG. 2 illustrates data structures that may be included in the relationship table 20 generated by the storage management software 18 when establishing a point-in-time copy operation implemented. The relationship table 20 is comprised of a plurality of relationship table entries 40, only one is shown in detail, for each established relationship between a source and target volumes. Each relationship table entry 40 includes an extent of source tracks 42 indicating those source tracks in the source storage 8a involved in the point-in-time relationship and the corresponding extent of target tracks 44 in the target storage 8b involved in the relationship, wherein an ith track in the extent of source tracks 44 corresponds to the ith track in the extent of target tracks 46. A source relationship generation number 46 and target relationship number 48 indicate a time, or timestamp, for the source relationship including the tracks indicated by source extent 44 when the point-in-time copy relationship was established. The source and target relationship generation numbers 46 and 48 may differ if the source and target volume generation numbers differ. The timestamp indicated by the numbers 46 and 48 may comprise a logical timestamp value. In alternative implementations, alternative time tracking mechanisms may be used to keep track of the information maintained by numbers 46 and 48, such as whether an update occurred before or after the point-in-time copy relationship was established.

Each relationship table entry 40 further includes a relationship bit map 50. Each bit in the relationship bitmap 50 indicates whether a track in the relationship is located in the source storage 8a or target storage 8b. For instance, if a bit is "on" (or "off"), then the data for the track corresponding to such bit is located in the source storage 8a. In implementations where source tracks are copied to target tracks as part of a background operation after the point-in-time copy is established, the bit map entries would be updated to indicate that a source track in the point-in-time copy relationship has been copied over to the corresponding target track. In alternative implementations, the information described as implemented in the relationship bitmap 50 may be implemented in any data structure known in the art, such as a hash table, etc.

In FIG. 2, each relationship table entry 40 includes both information on the source and target tracks involved in the relationship. In certain implementations, there may be separate source and target relationship table entries that maintain only information on the source side of the relationship, such as the source extent 42 and source generation number 46 and entries that have only information on the target side, such as the target extent 44 and target generation number 48, and additional information in each to associate the source and target relationship table entries. The relationship table entries 40 may indicate additional information, such as the device address of the source 8a and target 8b storage devices, number of tracks copied over from the source extent 42 to the target extent 44, etc. As discussed, after the point-in-time copy is established, the physical data may be copied over from the source to target as part of a background operation. Additional information that may be maintained in a relationship table used to establish a point-in-time copy is further described in the co-pending and commonly assigned patent entitled "Method, System, and Program for Maintaining Electronic Data at of a Point-in-time", having U.S. Pat. No. 6,611,901, which application is incorporated herein by reference in its entirety.

In described implementations, additional relationship information may be maintained for each track in cache 14a, 14b and with each volume 10a, 10b . . . 10n, 12a, 12b . . . 12m including tracks involved in the point-in-time copy, i.e., tracks identified in the source 44 and target 46 extents. FIG. 3 illustrates that caches 14a, 14b include track metadata 60a . . . 60n for each track 62a . . . 62n in cache 14a, 14b. In described implementations, the track metadata 60a . . . 60n includes a track generation number 64a . . . 64n that is used to maintain data consistency for the logical point-in-time copy relationship as discussed below. The track generation number 64a . . . 64n indicates a time or timestamp of the volume, referred to as the volume generation number, of the volume including the track when the track is promoted into cache.

FIG. 4 illustrates volume metadata 80 within the volume metadata 22 that would be maintained for each volume 10a, 10b . . . 10n and 12a, 12b . . . 12m configured in storage 8a, 8b. In certain implementations, the volume metadata 80 would additionally include a volume generation number 82 for the particular volume that is used in maintaining the point-in-time copy relationship as discussed below. The volume generation number 82 is incremented each time a relationship table entry 40 is established in which the volume is a target or source. Thus, the volume generation number 82 is the clock and indicates a timestamp following the most recently created relationship generation number for the volume. Each source and target volume would have volume metadata providing a volume generation number for that volume involved in a relationship as a source or target.

Figure 5:
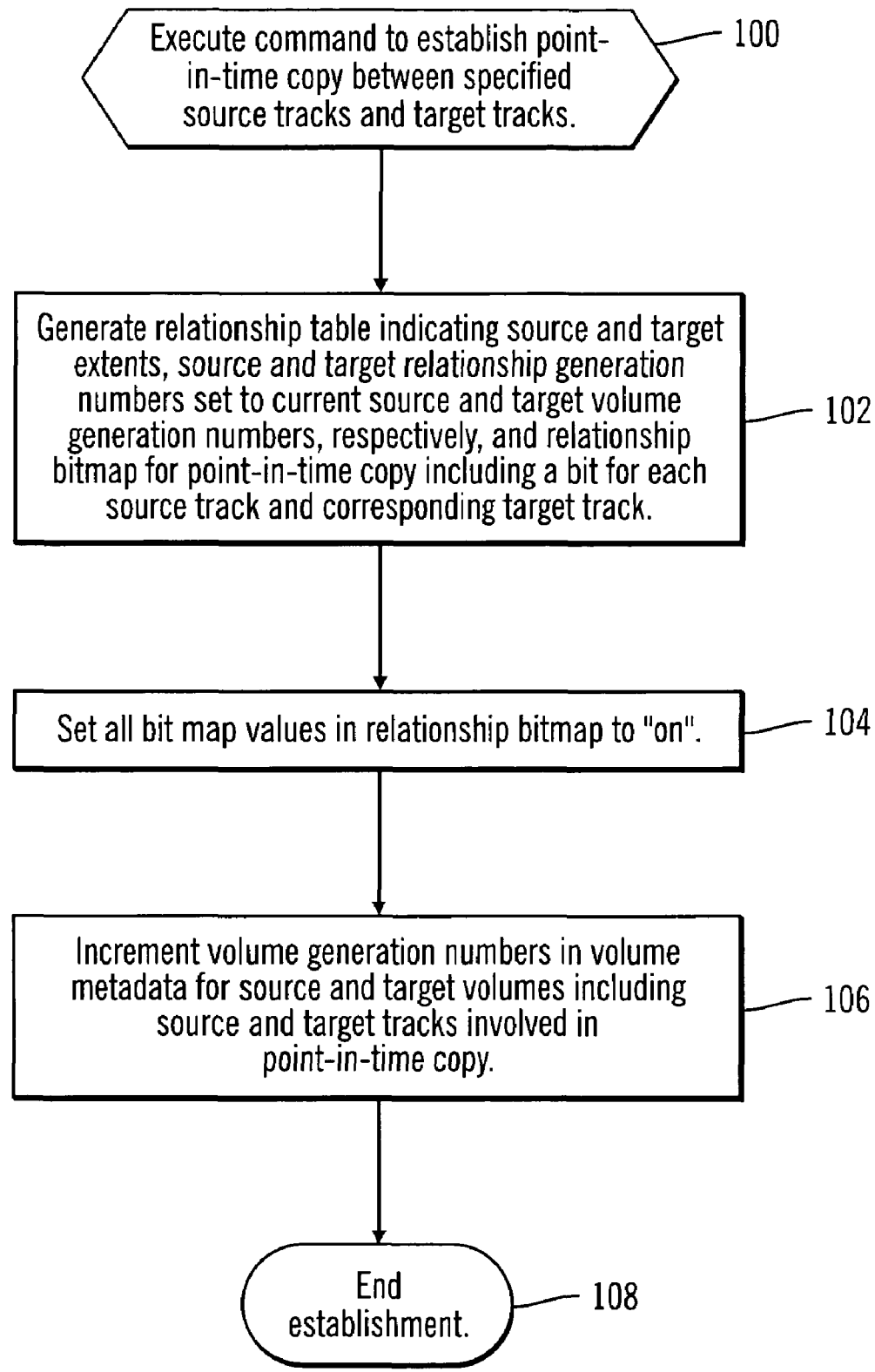
FIGS. 5, 6, 7, 8, 9, 10, and 11 illustrate logic to establish and maintain a logical point-in-time copy relationship in accordance with implementations of the invention.

FIG. 5 illustrates logic implemented in the storage management software 18 to establish a point-in-time copy relationship between tracks in the source storage 8a and tracks in the target storage 8b, such as may occur as part of a FlashCopy® operation or any other type of logical copy operation. Upon receiving (at block 100) a command from a host 4a, 4b . . . 4n to establish a point-in-time copy relationship between specified source tracks and specified target tracks, the storage management software 18 generates (at block 102) a relationship table entry 40 indicating an extent of source tracks 42 and target tracks 44 subject to the logical copy relationship; source and target relationship generation numbers 46, 48 set to the current source and target volume generation numbers of the source and target volumes including the source and target tracks; and a relationship bitmap 50 including a bit for each target-source track pair indicating whether the data from the source track has been copied to the corresponding target track. All the bits in the relationship bitmap 40 may be initialized (at block 104) to "on". As mentioned, a background copy operation may copy the source tracks to the target tracks after the logical point-in-time copy is established. When a source track is copied to a target track as part of such a background copy operation or any other operation, then the bit corresponding to the source track just copied to the target track is set to "off" indicating that the source track as of the point-in-time has been copied to the corresponding target track at the target storage 8b. The storage management software 18 then increments (at block 106) the volume generation numbers 82 in the volume metadata 80 for the source and target volumes including source and target tracks included in the point-in-time copy relationship.

With the described logic, the establishment process ends after generating the copy relationship information as a relationship table entry 40 and updating the volume metadata 80. With the described logic, the point-in-time copy relationship is established without having to destage any source tracks in the source cache 14a and discard target tracks in the target cache 14b. This reduces the establishment process by a substantial amount of time, such as several seconds, thereby reducing the time during which the source and target volumes are offline to host I/O access during the establishment of the point-in-time copy relationship.

Figure 6:
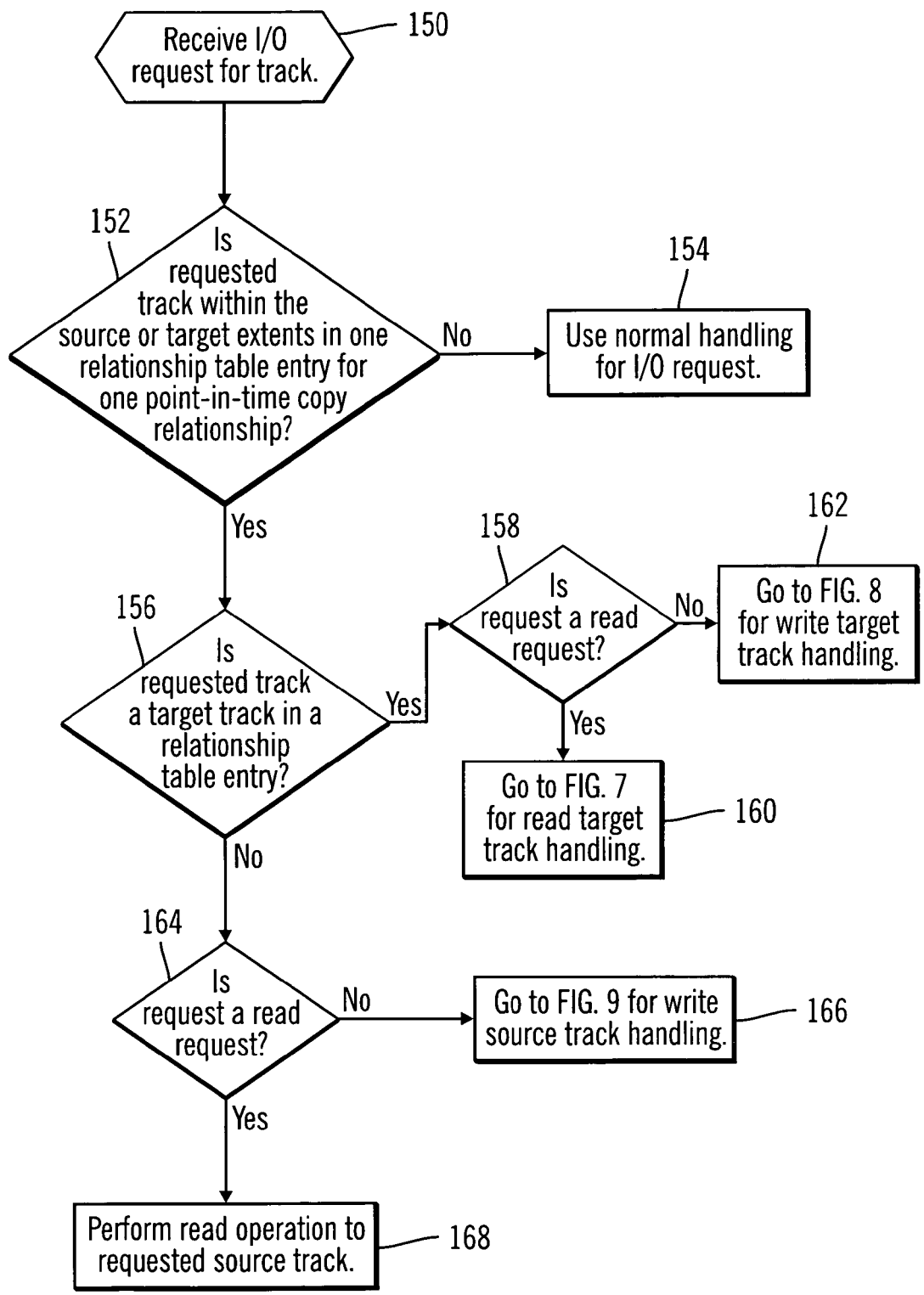

FIGS. 6–11 illustrates logic implemented in the storage management software 18 to use the track and volume generation numbers to handle I/O requests and ensure data consistency for the logical point-in-time copy. FIG. 6 illustrates logic to handle an I/O request from a host 4a, 4b . . . 4n. Upon receiving (at block 150) a host I/O request toward a track in one of the storage resources 8a, 8b, the storage management software 18 determines (at block 152) whether the requested tracks are within the source 42 or target 44 extents indicated in at least one relationship table entry 40 for one point-in-time copy relationship. There may be multiple point-in-time copy relationships, represented by different relationship table entries, in effect at any given time. If the requested tracks are not subject to any point-in time copy relationship, then normal I/O request handling is used (at block 154) for the request.

Figure 7:
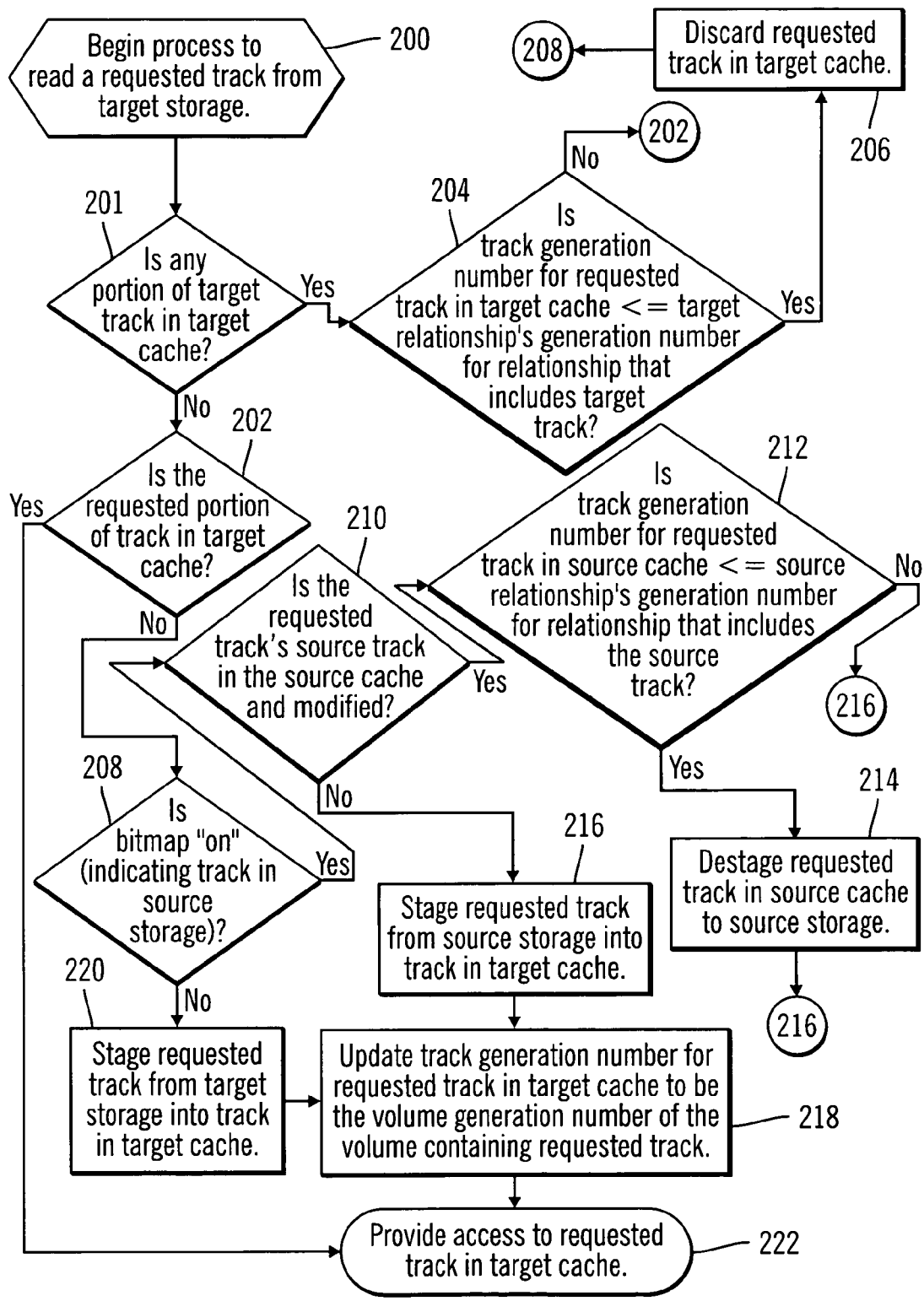
Figure 8:
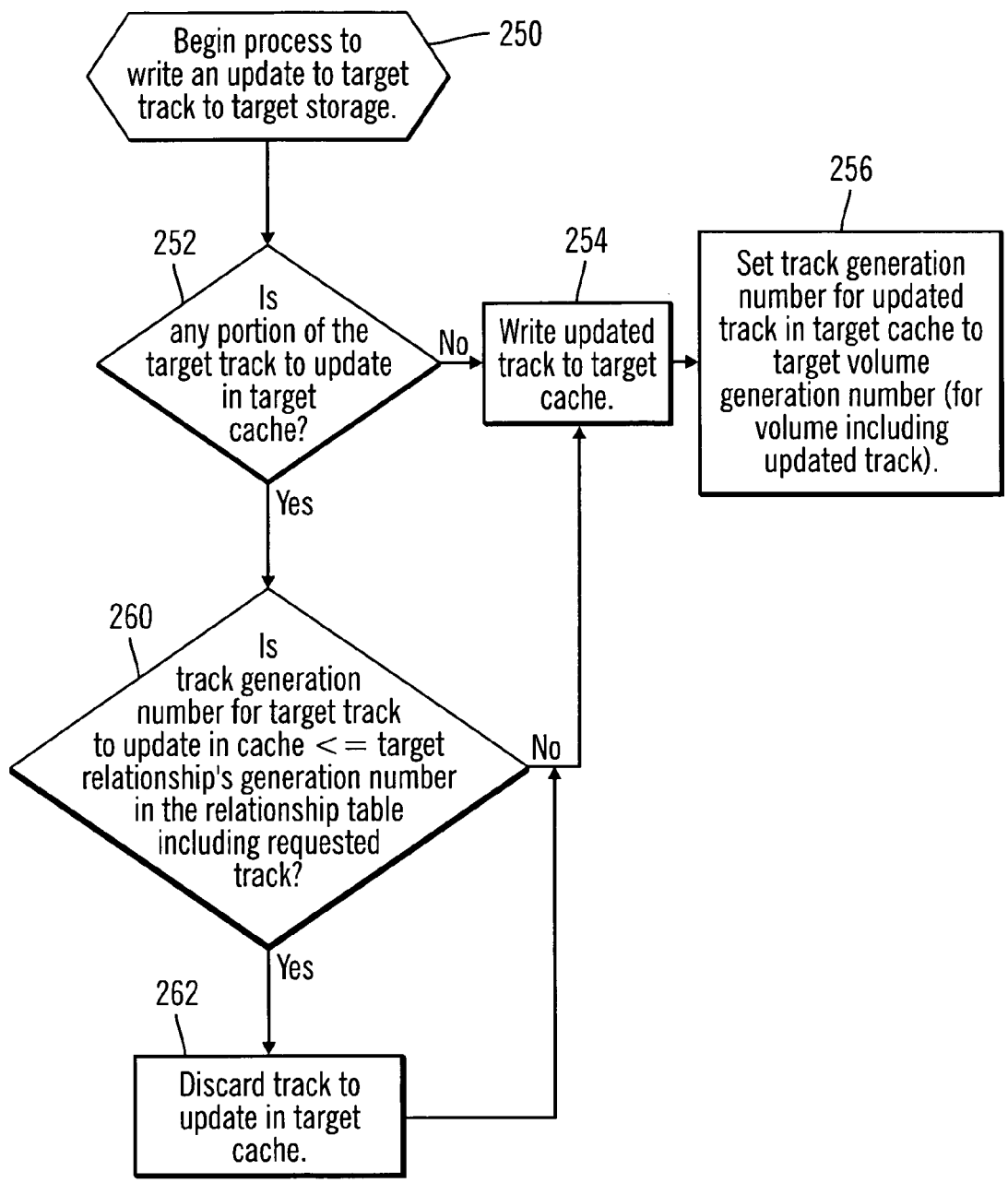

If the track subject to the I/O operation is a source and/or target in one or more point-in-time copy relationships, i.e., indicated in a source 42 or target 44 extent in a relationship table entry 40 and if (at block 156) the requested track is included within an extent of target tracks 44 in a relationship table entry 40, then control proceeds (at block 160) to FIG. 7 if the I/O request is a read request or FIG. 8 (at block 162) if the request is a write to a target track. If (at block 156) the track subject to the I/O request is a source track, then if (at block 164) the request is a write, control proceeds (at block 166) to the logic of FIG. 9. Otherwise, if the request is to read to a track that is a source track in a point-in-time relationship, the storage management software 18 provides read access (at block 168) to the requested track.

At block 160 in FIG. 6, if the host 4a, 4b . . . 4n I/O request is to read a requested track that is a target track in a point-in-time copy relationship, then control proceeds to block 200 in FIG. 7 to read a target track from storage. If (at block 201) any portion of the target track is in the target cache 14b, then the storage management software 18 determines (at block 204) whether the track generation number 64a . . . 64n for the requested track in the target cache, which would be included in the track metadata 60a . . . 60n for the requested target track, is less than or equal to the target relationship generation number 48 for the relationship table entry 40 that includes the target track, i.e., was the target track in the target cache before the point-in-time relationship was created. If so, then the requested target track in the target cache 14b is discarded (at block 206).

If (from the no branch of block 204) the requested target track in the target cache was added to cache after the point-in-time relationship was established or if no portion of the target track is in the target cache 14b (from the no branch of block 201), then control proceeds to block 202. If (at block 202) the requested portion of the track is not in the target cache 14b, a determination is made (at block 208) as to whether the bit in the relationship bitmap 50 for the requested target track is "on", indicating that the track in the source storage has not been copied over. If the bit is "on", then the storage management software 18 determines (at block 210) whether the requested track's source track is in the source cache 14a and modified. If (at block 210) the track is in the source cache 14a and modified, then a determination is made (at block 212) as to whether the track generation number for the requested track in the source cache 14a is less than or equal to the source relationship generation number 46 in the relationship table entry 40 that includes the source track, i.e., whether the modified track was in the source cache 14a before the point-in-time relationship was established. If the requested track's source track in the source cache 14a was in cache prior to the establishment of the point-in-time relationship, then the storage management software 16 destages (at block 214) the requested track in the source cache 14a to the track in the source storage 8a.

From the no branch of block 212, from block 214 or from the no branch of block 210, control proceeds to stage (at block 216) the requested track from the source storage 8a into the corresponding target track in the target cache 14b. The track generation number 64a . . . 64n in the track metadata 60a . . . 60n for the target track is then updated (at block 218) to the volume generation number 82 in the volume metadata 80 (FIG. 4) for the volume including the requested target track. If (at block 208) the bitmap is off, indicating that the track in the source storage has been destaged to the target storage 8b, then the requested track is staged (at block 220) from the target storage 8b into the target cache 14b. From blocks 202 (yes branch), 218 or 220, once the requested track is in the target cache 14b, then access is provided (at block 222) to the requested track in the target cache 14b.

At block 162 in FIG. 6, if the host 4a, 4b . . . 4n I/O request is to a write request to a target track in a point-in-time copy relationship, i.e., a track that is listed in an extent of target tracks 46 (FIG. 2), then the storage management software 18 executes the logic of FIG. 8 at block 250. If (at block 252) no portion of the target track to update is in the target cache 14b, then the storage management software 18 writes (at block 254) the update to the track to the target cache 14b and sets (at block 256) the track generation number 64a . . . 64n for the updated track in the target cache 14b to the volume's generation number 82 (FIG. 4) for the target volume including the updated track to indicate the updated track in cache was added after the point-in-time copy relationship including the target track was established. The bit may be turned "off" at the time of destage, not at the time of write.

If (at block 252) the target track to update is in the target cache 14b, then the storage management software 18 determines (at block 260) whether the track generation number 64a . . . 64n for the target track to update in the target cache 14b is less than or equal to the target relation generation number 48 (FIG. 2), i.e., whether the target track to update was in the target cache 14b before the point-in-time copy relationship was established. If so, then the target track to update in the target cache 14b is discarded (at block 262) because the target track to update was in the target cache 14b when the point-in-time copy relationship was established. From the no branch of block 260 or after discarding (at block 262) the target track to update from the target cache 14b, control proceeds to block 254 to write the update to the target track in the target cache 14b. With the logic of FIG. 8, any data that was in the target cache 14b at the time the point-in-time copy relationship was established is discarded before updates are applied to such data in the target cache 14b.

Figure 9:
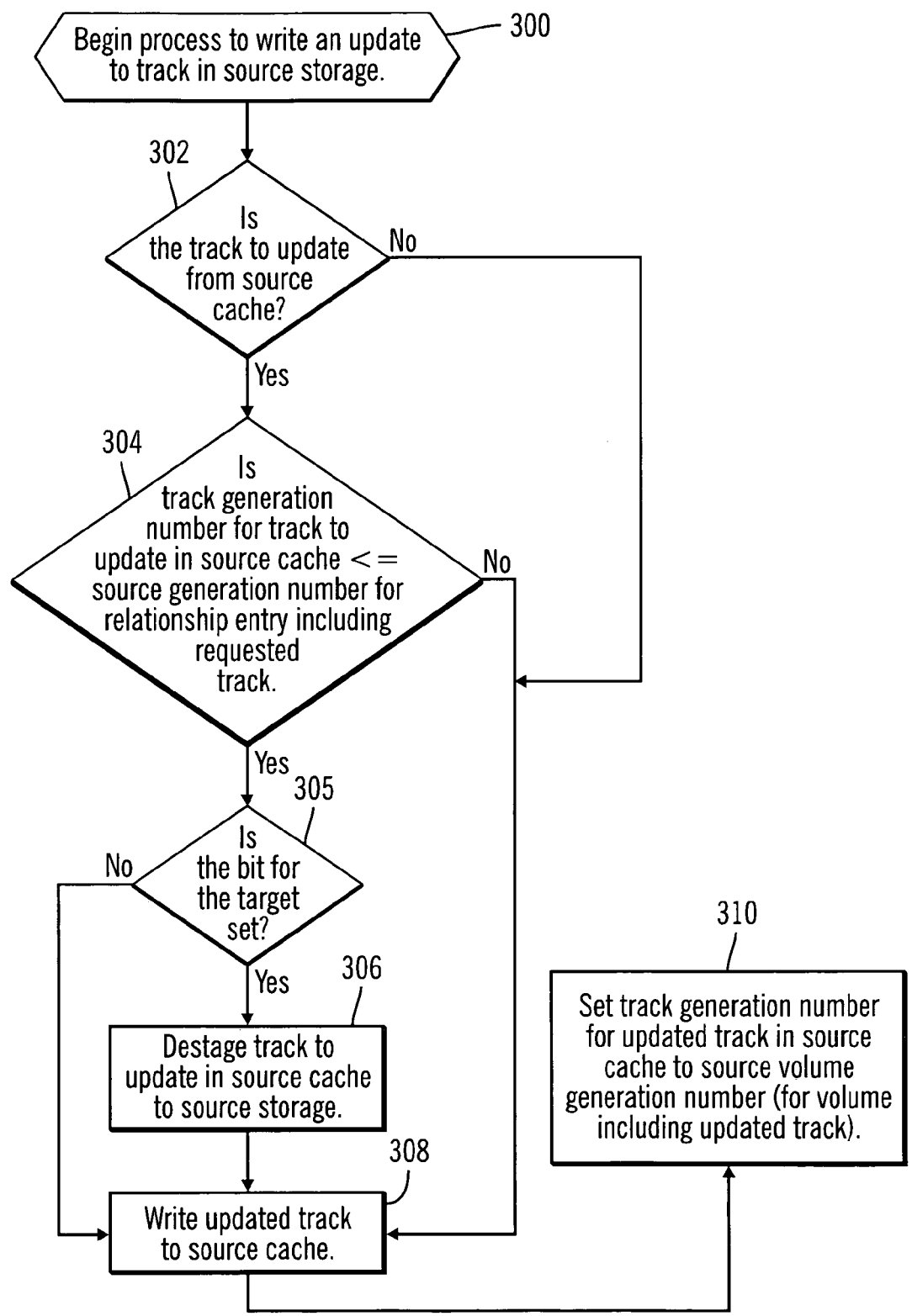

At block 166 in FIG. 6, if the host 4a, 4b . . . 4n I/O request is a write request to a track that is a source track in a point-in-time copy relationship, i.e., listed in an extent of source tracks 42 in one relationship table entry 40, then control proceeds to block 300 in FIG. 9. If (at block 302) the track to update is in the source cache 14a, then a determination is made (at block 304) as to whether the track generation number 64a . . . 64n (FIG. 3) for the track to update in the source cache 14a is less than or equal to the relationship generation number 48 for the source relation including the source track to update, which comprises a determination of whether the update will be applied to a track that was in the source cache 14a when the point-in-time copy was established. If the track to update was in the source device 8a when the point-in-time copy was established and if (at block 305) the relationship bitmap 50 for the relationship table entry 40 for the track indicates that the track to update is still in source cache 14a, then the storage management software 18 destages (at block 306) the track to update from the source cache 14a to the source storage 8a. If (at block 305) the bit for the track was not set after or destaging the track (at block 306) or if the track in the source cache 14a has been updated following the establishment of the point-in-time copy relationship (from the no branch of block 304), then control proceeds to block 308 to write the update to the source track in the source cache 14a. Further, if (at block 302) the source track to update is not in the source cache 14a, which means it is in the source storage 8a, then control proceeds to block 308 to write the update to the source track in the source cache 14a. The storage management software 18 then sets (at block 310) the track generation number 64a . . . 64n for the updated track in the source cache 14a to the source volume generation number 82 for the volume including the updated track.

Figure 10:
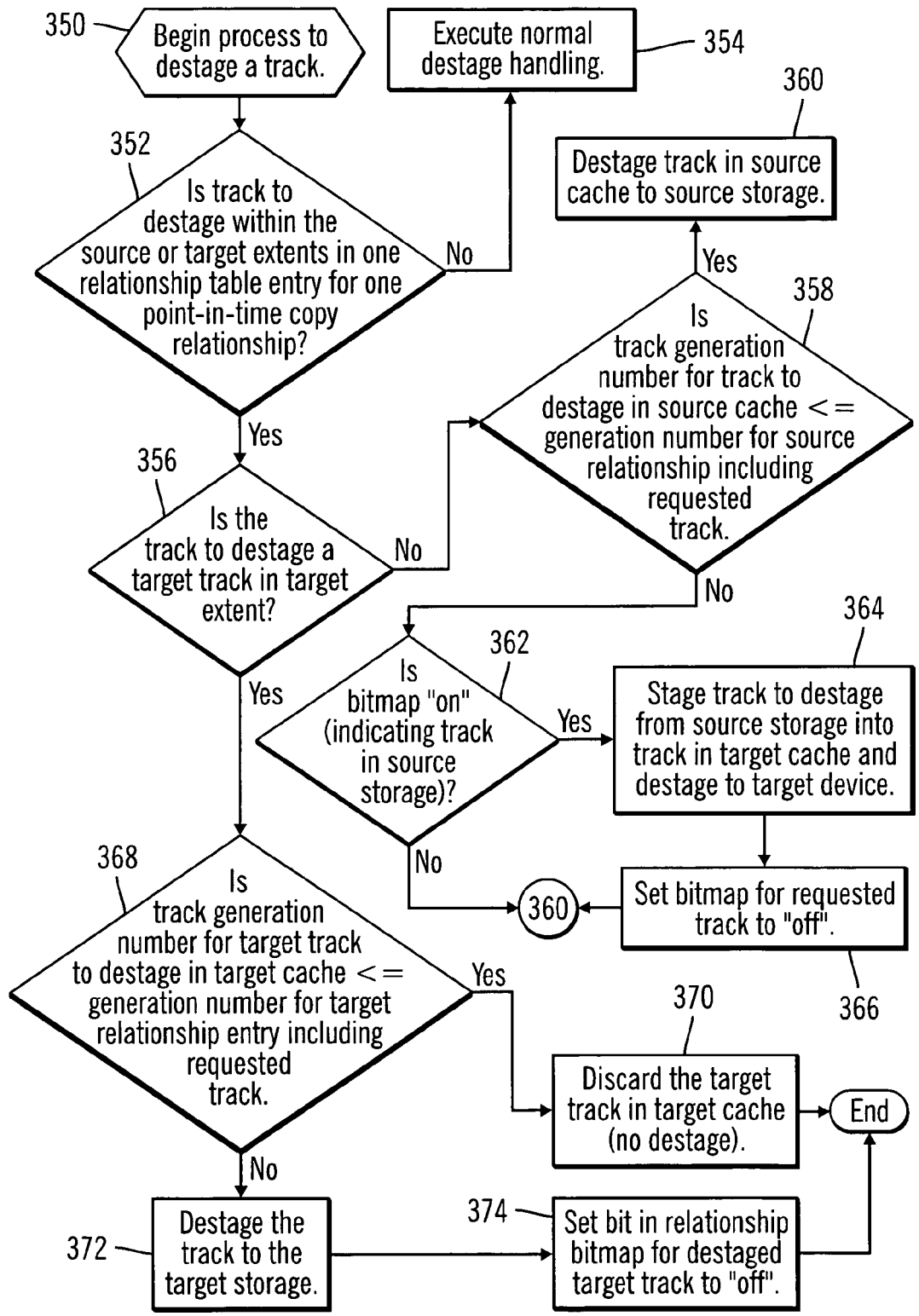

FIG. 10 illustrates logic implemented in the storage management software 18 to destage a track from cache in a manner that avoids any inconsistent operation with respect to the point-in-time copy relationship that was established without destaging data from the source cache 14a nor discarding any data from the target cache 14b. Data may be destaged from the caches 14a, 14b as part of normal cache management operations to make space available for subsequent data. Upon beginning the destage process (at block 350), if (at block 352) the track to destage is not within the source or target extents 42, 44 in one relationship table entry 40 for one point-in-time copy relationship, then the storage management software 18 performs (at block 354) normal destage handling. However, if the track subject to destage is a source or target in a point-in-time relationship and if (at block 356) the track to destage is a source track as indicated in an extent of source tracks 42, then a determination is made (at block 358) as to whether the track to destage was in the source cache 14a when the point-in-time copy relationship was established, which is so in certain implementations if the track generation number 64a . . . 64n for the track 62a . . . 62n (FIG. 3) to destage is less than or equal to the source relationship generation number 46 for the relationship table entry 40 including the track to destage. If the track to destage was in the source cache 14a when the point-in-time copy relationship was established, then the storage management software 18 destages (at block 360) the track to the source storage 8a. Otherwise, if (at block 358) the track was updated in cache after the point-in-time copy was established and if (at block 362) the bit in the relationship bitmap 50 corresponding to the track to destage is set to "on", indicating the track has not been copied over from the source storage, then the track to destage is staged (at block 364) from the source storage 8a to the target cache 14b and destaged to the target storage 8b. The bit corresponding to the track to destage in the relationship bitmap 50 is then set (at block 366) to "off". Control then proceeds to block 360 to destage the track from block 366 or if (at block 362) the bit is "off".

If (at block 356) the track to destage is a target track in a point-in-time relationship, i.e., in an extent of target tracks 44 in a relationship table entry 40 (FIG. 2), and if (at block 368) the track to destage was in the target cache 14b when the point-in-time copy relationship was established, which is so if the track generation number 64a . . . 64n for the track 62a . . . 62n to destage is less than or equal to the target relationship generation number 48 (FIG. 2) for the target track is discarded (at block 370). In such case, the track is not destaged to the target storage 8b. Otherwise, if (at block 368) the target track to destage was added to the target cache 14b after the point-in-time copy relationship was established, which is so if the track generation number 60a . . . 60n for the track 62a . . . 62n to destage is greater than the target relationship generation number 48 (FIG. 2), then the track in the target cache 14b is destaged (at block 372) to the target storage 8b and the bit corresponding to the track in the relationship bitmap 40 is set to "off", because the updated track was destaged after the point-in-time copy relationship was established. When destaging data from cache, if the bit for the track in the target relationship bitmap is "on", and if any portion of the target track to destage is not in cache, then that missing data is staged into cache from the source so that the entire track is destaged from cache.

Figure 11:
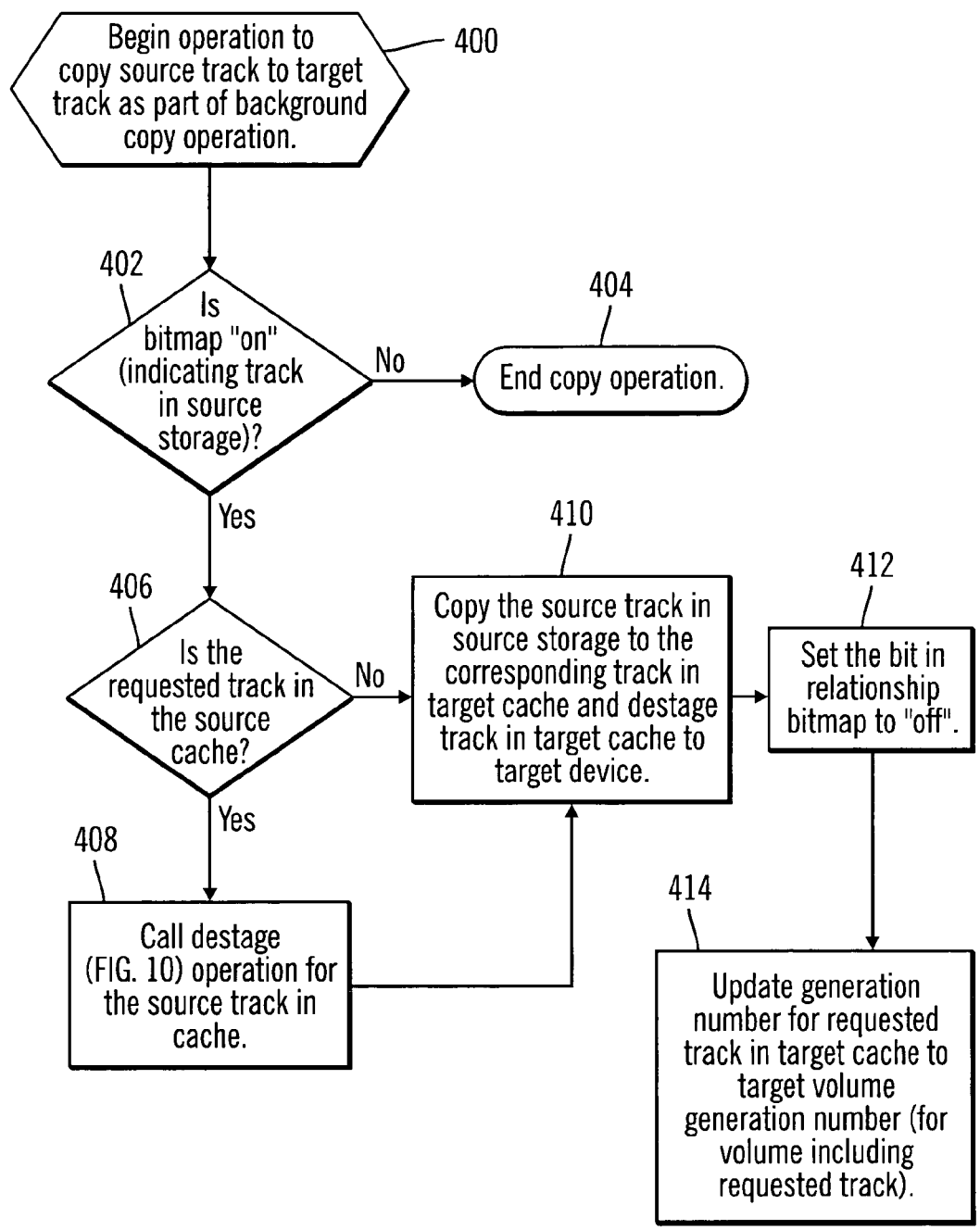

FIG. 11 illustrates logic implemented in the storage management software 18 to copy the data in the source storage 8a or cache 14a when the point-in-time copy relationship was established to the target storage 8b. This copy operation may be performed as part of a background operation, where host 4a, 4b . . . 4n I/O requests have priority over the copy operations. Control begins at block 400 when a copy operation is initiated to copy a source track indicated in the extent of source tracks 42 for a point-in-time copy relationship to the target. If (at block 402) the bit in the relationship bitmap 50 corresponding to the source track to copy is set to "off", then the copy operation ends (at block 404) because the track has already been copied over, which may occur when processing I/O or destage operations as discussed with respect to FIGS. 7–10. If (at block 402) the bit is set to "on" and if (at block 406) the track to copy is in the source cache 14a, then a destage operation is called (at block 408) to destage the track to copy using the logic described with respect to FIG. 10. If (at block 406) the track to copy is not in the source cache 14a or following block 408, then the storage management software 18 copies (at block 410) the source track in the source storage 14a the corresponding target track in the target cache 14b. The bit in the relationship table 40 corresponding to the copied track is then set (at block 412) to "off" and the track generation number 64a . . . 64n for the copied track 62a . . . 62n in the target 14b cache is set (at block 414) to the target volume generation number 82 (for the target volume 12a, 12b . . . 12m including the copied track) to indicate that the track was added to the target cache 14b after the point-in-time copy relationship was established.

The described logic of FIGS. 6–11 ensures that data consistency is maintained for a point-in-time copy relationship between source and target tracks without destaging source tracks from the source cache to source storage and without discarding target tracks in the target cache that are in cache at the point-in-time of the establishment.

Scheduling Asynchronous Scans

A relationship is established, as shown in FIG. 5 discussed above, without completing the destaging of source tracks in cache and discarding of target tracks. As discussed with respect to FIG. 10, when destaging source tracks that were in cache when the relationship was established, the source tracks are staged into the track in the target cache and then destaged to the target device. In certain implementations, the destage and discard operations are scheduled as part of an asynchronous scan operation that occurs following the establishment of the relationship. Running the scans asynchronously following the establish allows the establishment of numerous relationships at a faster rate because the completion of the establishment is not delayed until the scan (i.e., removal from cache of source and target tracks) and completes.

Figure 12:
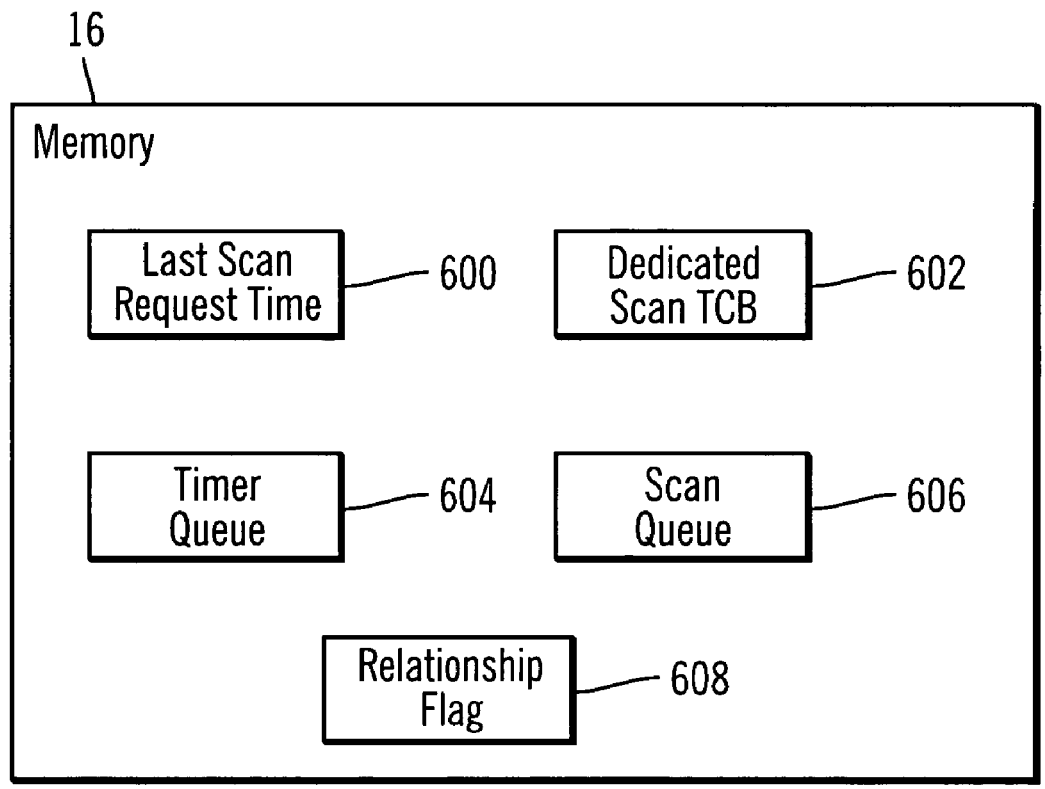
FIGS. 12 and 13 illustrate information used to manage scan requests to destage and discard tracks in a point-in-time copy relationship from cache.

FIG. 12 illustrates information the storage management software 18 maintains in memory 16 to manage the processing of the asynchronous scans to further optimize relationship establish operations. Such information includes a last scan request time 600 which indicates the time of the most recent asynchronous scan request that would have been made as part of the establishment of a relationship. This last scan request time 600 may comprise a global variable that applies across all volumes 10a, 10b . . . 10n, 12a, 12b . . . 12m managed by the storage controller 2 (FIG. 1). A dedicated scan task control block (TCB) 602 represents a process that is used to initiate scan operations to destage and discard all source and target tracks, respectively, for a relationship. A TCB is an operating system control block used to manage the status and execution of a program and its subprograms. The storage management software 18 would queue the dedicated scan TCB 602 in a timer queue 604 that delays the execution of the dedicated scan TCB for a delay time. This delay time is intended to throttle the processing of the asynchronous scans in order to avoid allocating a substantial amount of processing resources to the asynchronous scans in a manner that would not negatively impact I/O processing.

Figure 13:
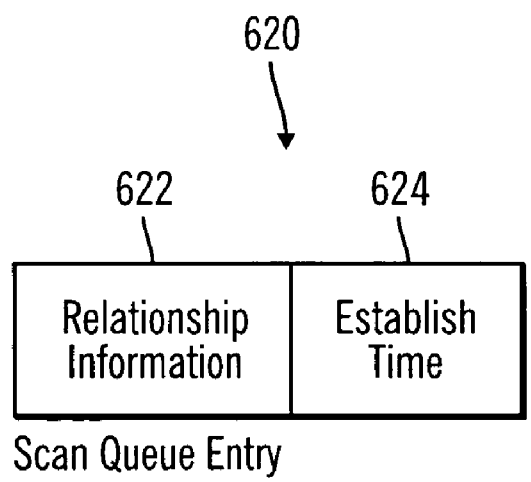

The storage management software 18 further maintains a scan queue 606 (FIG. 12) in which scan requests are queued. The scan queue 606 may queue asynchronous scan requests on a first-in-first-out (FIFO) basis. FIG. 13 illustrates a scan queue entry 620 that is queued in the scan queue 606 for an asynchronous scan generated when a relationship is established, and may include relationship information 622 identifying a particular relationship and an establish time 624 indicating when the asynchronous scan was requested. A relationship flag 608 indicates whether a relationship was registered since the last time the dedicated scan TCB 602 executed to invoke asynchronous scans.

Figure 14:
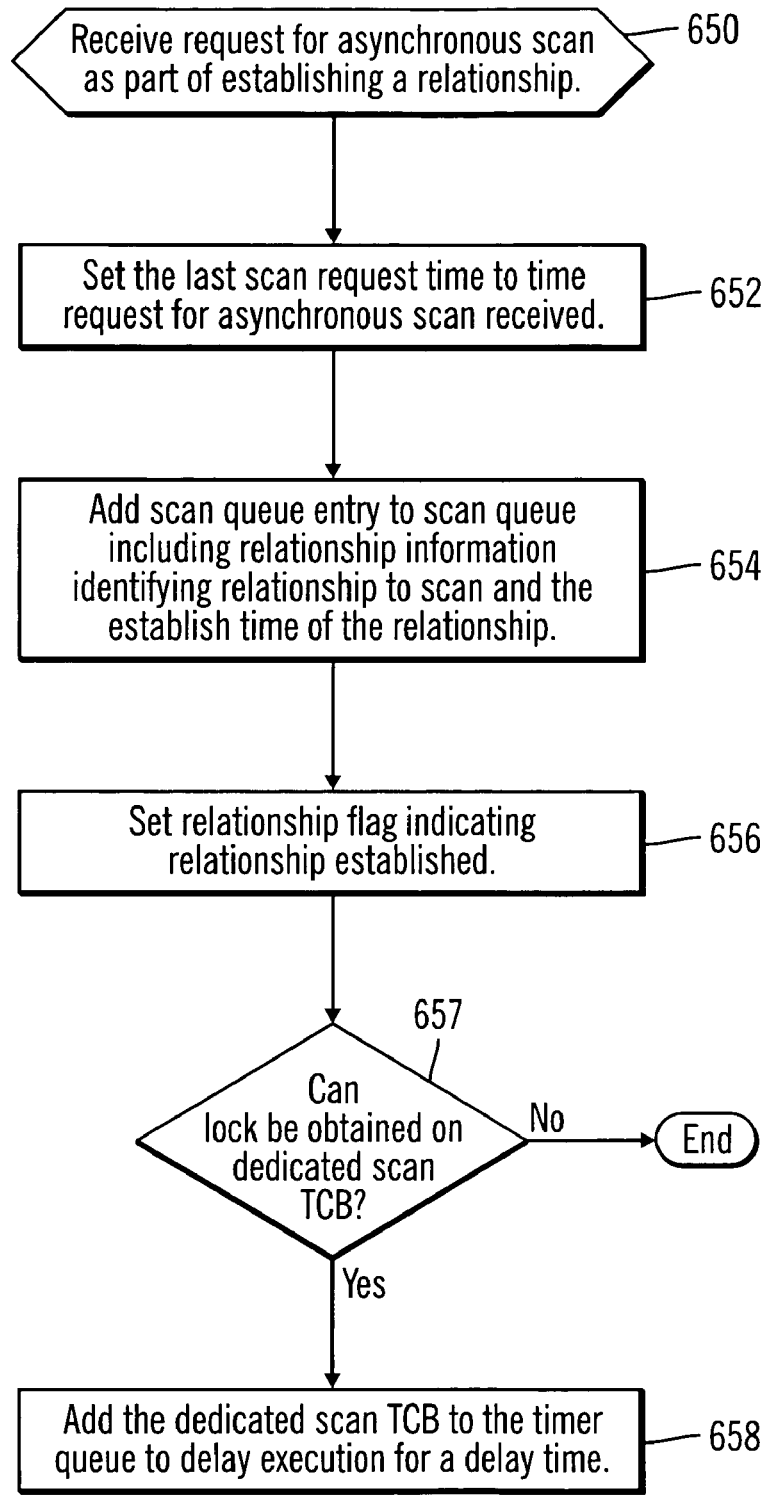
FIGS. 14 and 15 illustrate operations performed to manage scan requests to destage and discard tracks in a point-in-time copy relationship from cache.

FIG. 14 illustrates operations performed by the storage management software 18 to process a request to perform an asynchronous scan to destage source tracks and discard target tracks from cache 14a, 14b as part of establishing a relationship, which is described above with respect to FIG. 5. Upon receiving (at block 650) a request for an asynchronous scan, the last scan request time 600 is set (at block 652) to the time the request for the asynchronous scan was received. A scan queue entry 620 is added (at block 654) to the scan queue 606 including relationship information 622 identifying the relationship for which the scan was initiated and an establish time 624 of the relationship. The relationship flag 608 is set (at block 656) to indicate that a relationship was established. If (at block 657) a lock can be obtained on the dedicated scan TCB 602, then the dedicated scan TCB 602 is added (at block 658) to the timer queue 604, else the function ends. As discussed, the timer queue 604 delays the execution of the scan following the relationship establish for a delay time. This throttling of the scan operation prevents the storage controller 2 utilization from being dominated by asynchronous scans if there is a batch of relationship establish operations.

Figure 15:
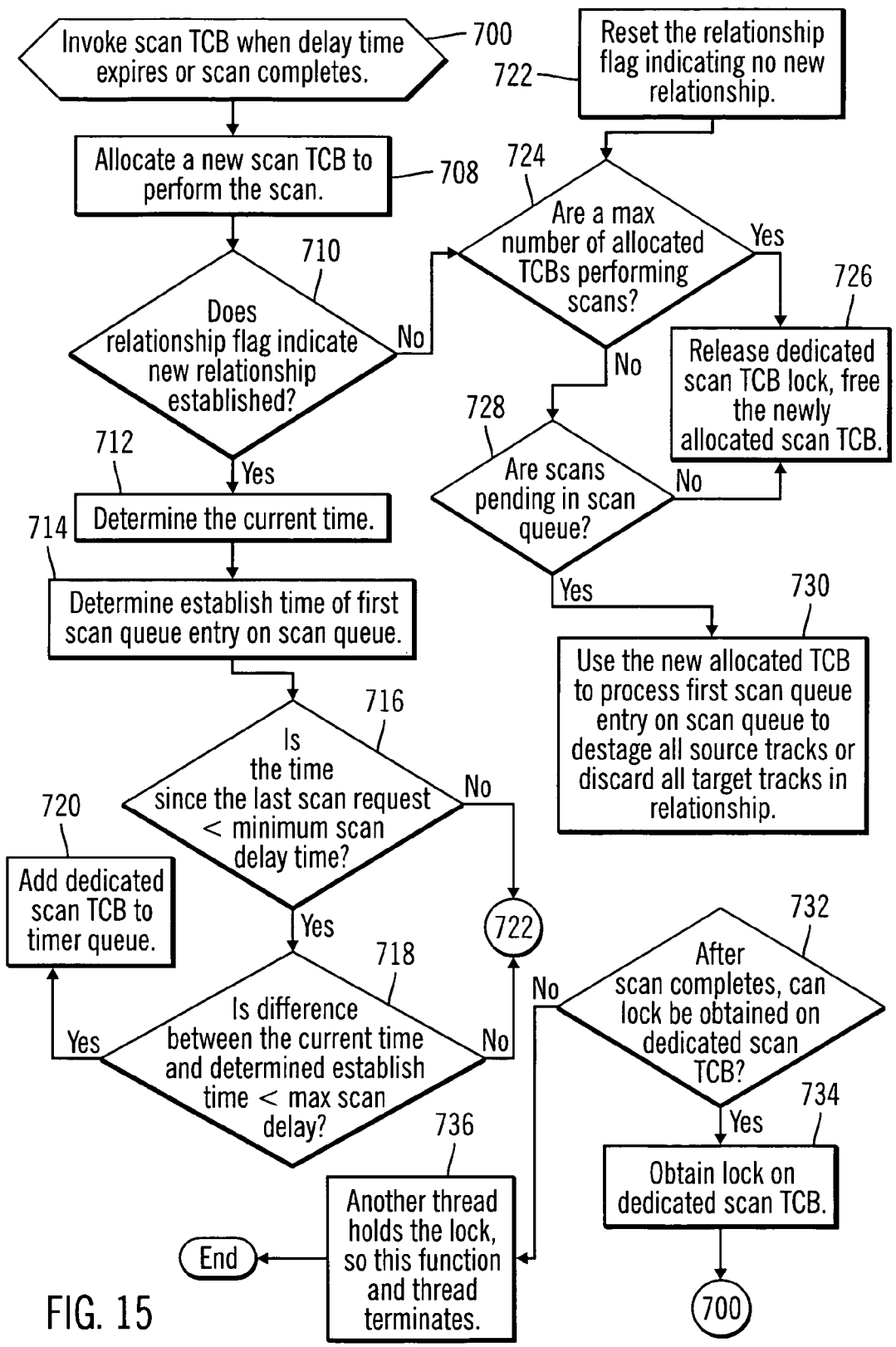

FIG. 15 illustrates operations performed by the dedicated scan TCB 602 to process an asynchronous scan when the delay time for the timer queue 604 expires or a scan completes, which will invoke the dedicated scan TCB 602 to process a scan queue entry 620. When the thread that holds the lock on the dedicated scan TCB 620 makes a call (at block 700) to the dedicated scan TCB 620 to perform the scan when the delay timer expires or a scan completes, a new scan TCB is allocated (at block 708), but not yet deployed, to perform the asynchronous scan. If (at block 710) the relationship flag 608 indicates that a new relationship was established since the last scan, then a determination is made at blocks 712, 714, and 716 to determine whether current pending scan requests have been delayed a sufficient amount of time to warrant processing the scan. This maintains the throttling of processing the asynchronous scans. At block 712 and 714, the current time and the establish time 624 of the first entry in the scan queue 606 are determined. If (at block 716) the time since the last scan request 600 from the current time is less than a minimum delay time for a new relationship and if (at block 718) the difference between the current time and the time of the determined establish of the oldest entry on the queue is less than a maximum wait time, then the delay has not been sufficient and the dedicated scan TCB 602 is placed back (at block 720) on the timer queue 604 to wait the delay time before being invoked again.

If (at block 716) there has been sufficient delay since the last relationship was established and if (at block 718) the oldest scan queue entry 620 on the scan queue 606 has been pending at least a maximum wait time, then control proceeds to block 722 to initiate a scan. At block 722, the relationship flag 608 is reset to indicate that no new relationship has been established since the last scan processed. If (at block 724) there are a maximum number of currently running asynchronous scans, e.g., called allocated scan TCBs, then the lock on the dedicated scan TCB 602 is released (at block 726) to make available to the next queued request attempting to initiate a scan. If (at block 724) the maximum number of scans are not running and if (at block 728) there are no pending scan queue entries 620 on the scan queue 608, then control proceeds to block 726 to release the dedicated scan TCB 602. If (at block 728) there are pending scans entries, then the dedicated scan TCB 602 processes (at block 730) the first scan queue entry 620 on the scan queue 606 to destage all source tracks or discard all target tracks in the relationship identified in the relationship information 622 for the first scan queue entry 620. One scan request may be used to destage source tracks and another to discard target tracks. After the scan completes, i.e., all tracks in the relationship are removed from cache, a determination is made (at block 732) whether a lock can be obtained on the dedicated scan TCB 602. If so, the lock is obtained (at block 734) and control proceeds back to block 700 to process a next entry on the scan queue. Otherwise another thread holds the lock, so this function and thread terminates (at block 736).

With the logic of FIG. 15, the processing of asynchronous scans are throttled and delayed in order to avoid overburdening the storage controller 2 processor utilization with scans. This throttling of scan processing allows multiple establishes to complete at a faster rate because the ensuing asynchronous scans that would follow establishing relationships are delayed, thereby freeing storage controller processor resources to complete establishing relationships. Empirical determinations may be used to set the time delays used at blocks 716 and 718 and the limit on the maximum number of concurrently executing scans to optimize throttling and to prevent scan operations from overly burdening processor utilization.

Further, with described implementations, the processing of scan requests is serialized by using the dedicated scan TCB which can only be invoked by one process at a time, in response to a relationship establishment or a scan complete, to further throttle and control the initiation of the scan operations. Still further, the serialization may occur across all volumes, processes and processors attempting to initiate asynchronous scans.

Additional Implementation Details

The described techniques for performing scans to destage and discard source and target data in cache may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain implementations, at initialization, each volume would be assigned an initial volume generation number 82. This allows tracks to function as source tracks to different target tracks in different point-in-time copy relationships. In certain implementations, whenever performing the I/O and cache management operations described with respect to FIGS. 6–11, against a track that is a source track, i.e., listed in an extent of source tracks, in multiple point-in-time copy relationships, such operations are performed with respect to the subject track for each relationship in which the track is defined as a source track subject. Thus, the described logic would be separately performed for each point-in-time copy relationship.

The described implementations for establishing a logical point-in-time copy relationship were described for use with systems deployed in a critical data environment where high availability is paramount. However, those skilled in the art will appreciate that the point-in-time copy operations described herein may apply to storage systems used for non-critical data where high availability is not absolutely necessary.

In the described implementations, track and volume generation numbers were used to determine whether a track that is a source or target track in a point-in-time copy relationship was present in cache when the relationship was established. Those skilled in the art will appreciate that alternative variables and checking techniques may be used to determine whether a track in cache was added to cache before or after a point-in-time copy relationship was established.

In described implementations, the track and volume generation numbers are incremented and involved in specific compare operations. In alternative implementation, the track and volume generation numbers may be incremented and compared in a manner different than described to determine whether a track was in cache when the point-in-time copy relationship was established. For instance, the determination of whether a track was in cache may comprise determining whether the track generation number is less than the volume generation number, which is incremented before the point-in-time relationship is established, and which is incremented before the volume generation number is copied into the relationship table entry. Thereafter, any track added to cache is assigned the volume generation number, so that it be deemed to have been added to cache after the point-in-time relationship is established.

The source and target cache may be implemented in a same memory device or separate memory devices.

In described implementations, one dedicated scan TCB was used to serialize the invocation of processes. In alternative implementations, multiple processes may perform the operations described with respect to the scan TCB, and perform such operations concurrently to increase the level of initiated scans.

In the described implementations, determinations are made as to whether certain time periods fall within a threshold. In alternative implementations, different time conditions may be checked with respect to pending scan requests than those described herein to determine whether to initiate a scan.

The illustrated logic of FIGS. 6–11, 14, and 15 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The variables n and m are used to denote any integer variable for certain of the described elements and may indicate a same or different integer value when used in different instances.

Figure 16:
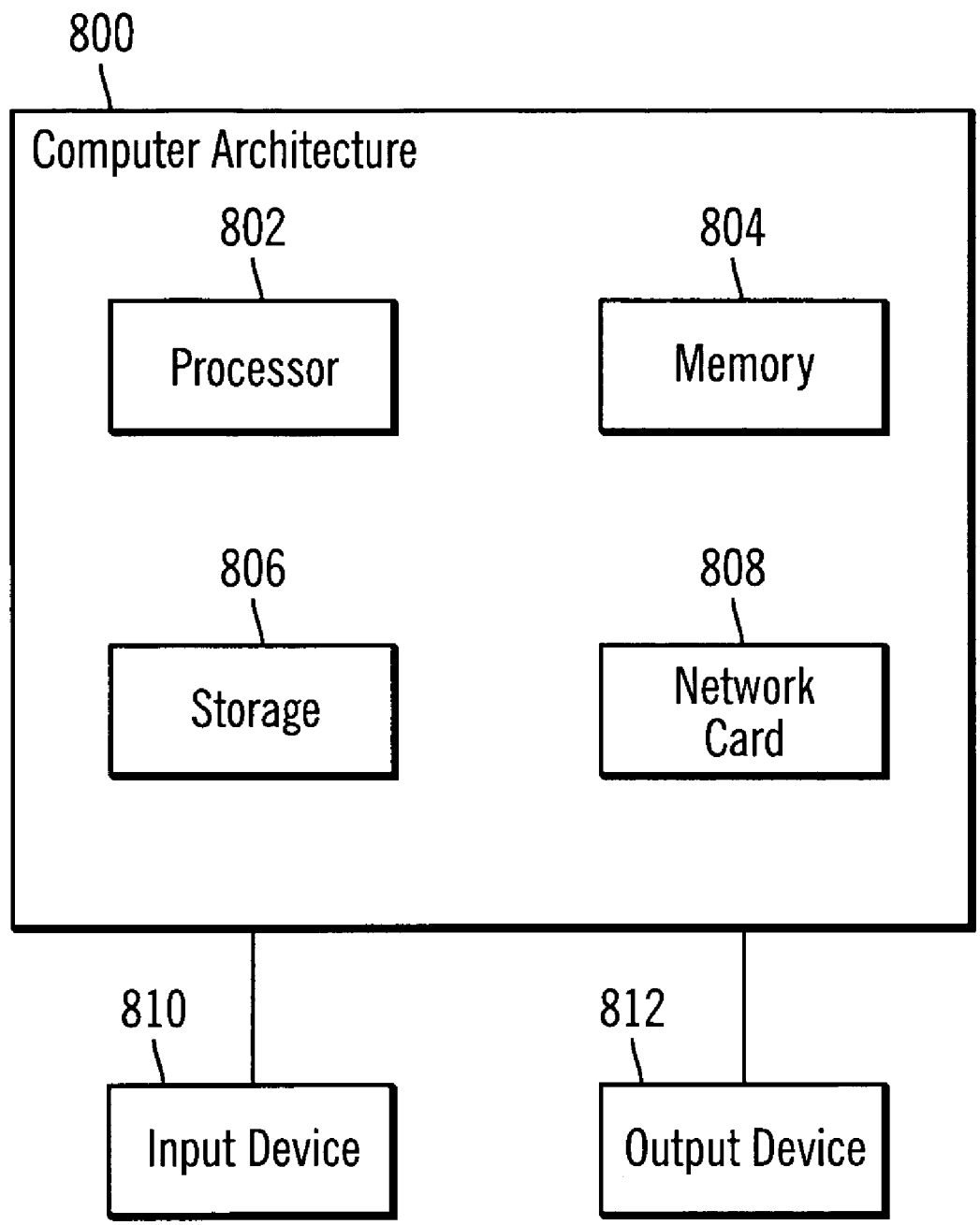
FIG. 16 illustrates an architecture of computing components in the network environment, such as the hosts and storage controller, and any other computing devices.

FIG. 16 illustrates one implementation of a computer architecture 800 of the network components, such as the hosts and storage controller shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing data, comprising:
   receiving a scan request to remove data from cache included in a relationship after the relationship is established;
   delaying processing the scan request for a delay time in response to receiving the scan request;
   after the delay time, determining whether a condition with respect to the scan request is satisfied; and
   processing the scan request to remove data from cache that is included in the relationship associated with the scan request if the condition is satisfied.

2. The method of claim 1, further comprising:
   queuing the scan request in a scan queue, wherein the scan queue includes multiple scan requests to remove data in different relationships from cache, and wherein processing the scan request comprises processing one queued scan request in the scan queue.

3. The method of claim 2, wherein determining whether the condition with respect to the scan request is satisfied comprises determining whether a time related to one queued scan request is less than a time period, wherein the condition is satisfied if the time related to the queued scan request is greater than the time period.

4. The method of claim 3, wherein determining whether the time related to one queued scan request comprises determining whether a difference between a current time and a time of a last received scan request is less than a time period, wherein the condition is satisfied if the difference is greater than the time period.

5. The method of claim 4, wherein the time period is a first time period, wherein the difference is a first difference, and wherein determining whether the condition with respect to the scan request is satisfied further comprises determining whether a second difference between a current time and an establish time of an oldest queued scan request is less than a second time period, wherein the condition is satisfied if the first difference is greater than the first time period and the second difference is greater than the second time period.

6. The method of claim 3, further comprising:
   after determining that the condition is satisfied, determining whether a maximum number of scan requests are being processed, wherein the scan request is processed if the number of scan requests being processed is less than the maximum number.

7. The method of claim 1, further comprising:
   after completing the processing of one scan request performing the steps of:
   (i) determining whether a condition with respect to the scan request is satisfied after the delay time; and (ii) processing the scan request to remove data from cache that is included in the relationship associated with the scan request if the condition is satisfied.

8. The method of claim 1, wherein delaying the processing of the scan request comprises queuing a scan task in a timer queue, wherein the queued scan task determines whether the condition is satisfied and, if so, allocates a scan request task to process the scan request.

9. The method of claim 8, wherein the scan queue includes multiple scan requests to remove data in different relationships from cache, and wherein processing the scan request comprises processing one queued scan request in the scan queue, further comprising:
   obtaining a lock on the scan task when queuing the scan task in the timer queue; and
   after the scan request task completes the processing of the scan request, calling, with the scan request task, the scan task to process a next queued scan task.

10. The method of claim 9, wherein the call to the scan task by one scan request task when completing the processing of one queued scan request or when the scan request is received is queued if the scan task is locked, wherein the queued call to the scan request is processed after the lock is released.

11. The method of claim 10, further comprising:
   after determining that the condition is satisfied, determining whether a maximum number of scan requests are being processed, wherein the scan request is processed by one scan request task if the number of scan requests being processed is less than the maximum number; and
   releasing the lock on the scan task if the number of scan request tasks outstanding processing scan requests is greater than the maximum number.

12. The method of claim 1, wherein the relationship comprises a point-in-time copy relationship between source and target data, and wherein removing the data from the cache that is included in the relationship comprises:
   destaging source data in the relationship in cache before the relationship was established to the source device;
   staging the source data in cache before the relationship was established to target data in cache; and
   discarding target data in the relationship in cache before the relationship was established.

13. A system for managing data, comprising:
   a cache;
   means for receiving a scan request to remove data from the cache included in a relationship after the relationship is established;
   means for delaying processing the scan request for a delay time in response to receiving the scan request;
   means for determining, after the delay time, whether a condition with respect to the scan request is satisfied; and
   means for processing the scan request to remove data from cache that is included in the relationship associated with the scan request if the condition is satisfied.

14. The system of claim 13, further comprising:
   means for queuing the scan request in a scan queue, wherein the scan queue includes multiple scan requests to remove data in different relationships from cache, and wherein processing the scan request comprises processing one queued scan request in the scan queue.

15. The system of claim 14, wherein the means for determining whether the condition with respect to the scan request determines whether a time related to one queued scan request is less than a time period, wherein the condition is satisfied if the time related to the queued scan request is greater than the time period.

16. The system of claim 15, wherein the means for determining whether the time related to one queued scan request determines whether a difference between a current time and a time of a last received scan request is less than a time period, wherein the condition is satisfied if the difference is greater than the time period.

17. The system of claim 13, wherein the means for delaying the processing of the scan request queues a scan task in a timer queue, wherein the queued scan task determines whether the condition is satisfied and, if so, allocates a scan request task to process the scan request.

18. A device implementing code for managing data in cache, wherein the code causes operations to be performed, the operations comprising:
   receiving a scan request to remove data from the cache included in a relationship after the relationship is established;
   delaying processing the scan request for a delay time in response to receiving the scan request;
   after the delay time, determining whether a condition with respect to the scan request is satisfied; and
   processing the scan request to remove data from cache that is included in the relationship associated with the scan request if the condition is satisfied.

19. The device of claim 18, wherein the operations further comprise:
   queuing the scan request in a scan queue, wherein the scan queue includes multiple scan requests to remove data in different relationships from cache, and wherein processing the scan request comprises processing one queued scan request in the scan queue.

20. The device of claim 19, wherein determining whether the condition with respect to the scan request is satisfied comprises determining whether a time related to one queued scan request is less than a time period, wherein the condition is satisfied if the time related to the queued scan request is greater than the time period.

21. The device of claim 20, wherein determining whether the time related to one queued scan request comprises determining whether a difference between a current time and a time of a last received scan request is less than a time period, wherein the condition is satisfied if the difference is greater than the time period.

22. The device of claim 21, wherein the time period is a first time period, wherein the difference is a first difference, and wherein determining whether the condition with respect to the scan request is satisfied further comprises determining whether a second difference between a current time and an establish time of an oldest queued scan request is less than a second time period, wherein the condition is satisfied if the first difference is greater than the first time period and the second difference is greater than the second time period.

23. The device of claim 20, wherein the operations further comprise:
   after determining that the condition is satisfied, determining whether a maximum number of scan requests are being processed, wherein the scan request is processed if the number of scan requests being processed is less than the maximum number.

24. The device of claim 18, wherein the operations further comprise:
   after completing the processing of one scan request performing the steps of:
   (i) determining whether a condition with respect to the scan request is satisfied after the delay time; and (ii) processing the scan request to remove data from cache that is included in the relationship associated with the scan request if the condition is satisfied.

25. The device of claim 18, wherein delaying the processing of the scan request comprises queuing a scan task in a timer queue, wherein the queued scan task determines whether the condition is satisfied and, if so, allocates a scan request task to process the scan request.

26. The device of claim 25, wherein the scan queue includes multiple scan requests to remove data in different relationships from cache, and wherein processing the scan request comprises processing one queued scan request in the scan queue, further comprising:

obtaining a lock on the scan task when queuing the scan task in the timer queue; and after the scan request task completes the processing of the scan request, calling, with the scan request task, the scan task to process a next queued scan task.

27. The device of claim 26, wherein the call to the scan task by one scan request task when completing the processing of one queued scan request or when the scan request is received is queued if the scan task is locked, wherein the queued call to the scan request is processed after the lock is released.

28. The device of claim 27, wherein the operations further comprise:

after determining that the condition is satisfied, determining whether a maximum number of scan requests are being processed, wherein the scan request is processed by one scan request task if the number of scan requests being processed is less than the maximum number; and releasing the lock on the scan task if the number of scan request tasks outstanding processing scan requests is greater than the maximum number.

29. The device of claim 18, wherein the relationship comprises a point-in-time copy relationship between source and target data, and wherein removing the data from the cache that is included in the relationship comprises:

destaging source data in the relationship in cache before the relationship was established to the source device;

staging the source data in cache before the relationship was established to target data in cache; and discarding target data in the relationship in cache before the relationship was established.

* * * * *